May 22, 1923.                                            1,456,465
                         A. RYGIEL ET AL
                   SAFETY DEVICE FOR MOTOR VEHICLES
                       Filed April 4, 1922           2 Sheets-Sheet 2
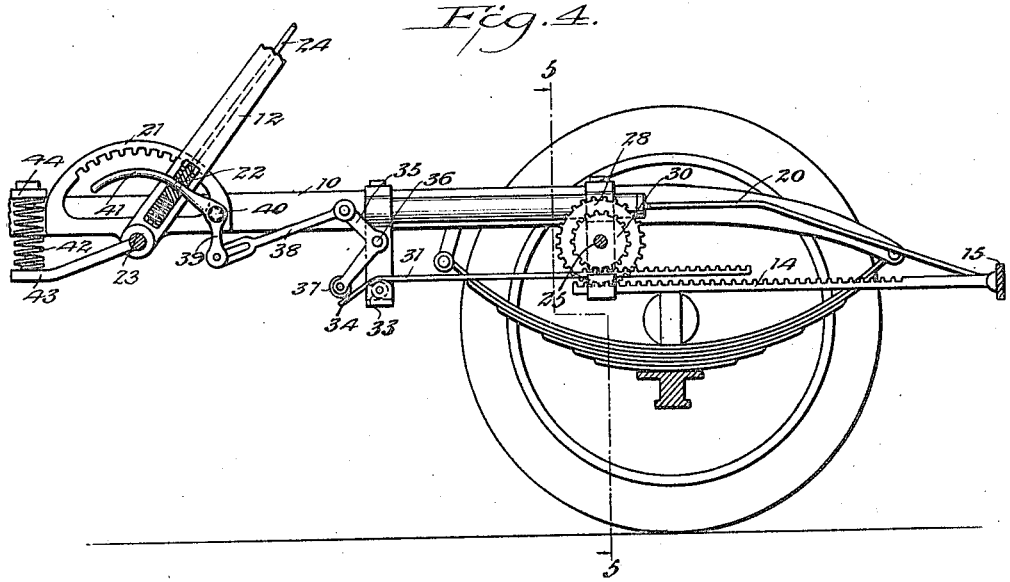
*Fig. 4.*
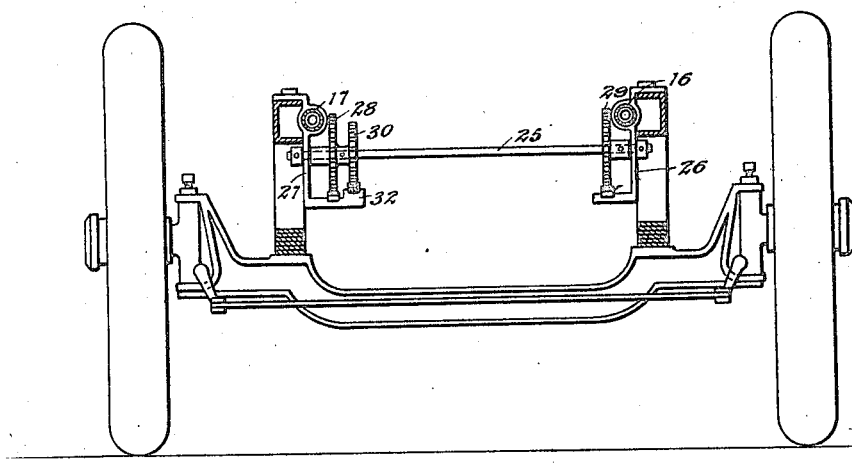
*Fig. 5.*
*Fig. 6.*
WITNESSES                                               INVENTORS
                                                      Andrew Rygiel
                                                      Julius Stern
                                                  BY
                                                        ATTORNEYS Patented May 22, 1923.

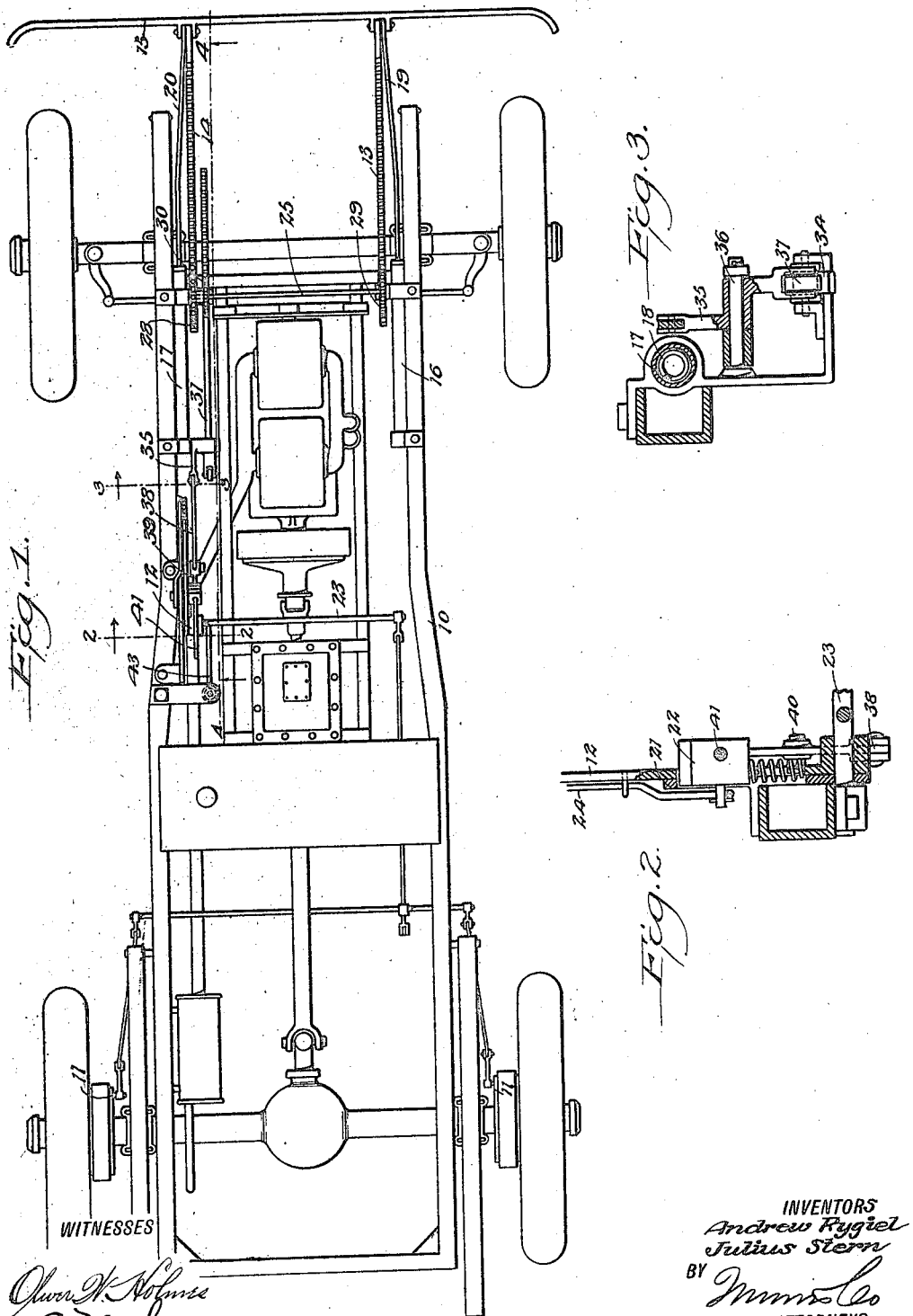

1,456,465

UNITED STATES PATENT OFFICE.

ANDREW RYGIEL AND JULIUS STERN, OF NEW YORK, N. Y.

SAFETY DEVICE FOR MOTOR VEHICLES.

Application filed April 4, 1922. Serial No. 549,396.

*To all whom it may concern:*

Be it known that we, ANDREW RYGIEL and JULIUS STERN, both citizens of the United States, and residents of the city of New York, borough of Manhattan, in the county and State of New York, have invented new and useful Improvements in Safety Devices for Motor Vehicles, of which the following is a full, clear, and exact description.

This invention relates to improvements in safety devices for use with motor vehicles.

Since motor vehicles have come into common use a great deal of damage has been done through collisions of different vehicles, the running into stationary objects and into individuals. Efforts have been made to provide means in conjunction with motor vehicles which will reduce the damage to the greatest possible extent. The need of devices to accomplish the above has called forth the inventor's efforts.

The general object of this invention is the provision of a device for use in conjunction with motor vehicles to cause the application of the brakes to stop the vehicle when an object has been struck.

This object is accomplished by mounting a bumper on means slidably mounted on the motor vehicle frame and associating with the slidable means lever releasing means which serve to release the emergency brake lever to cause the brakes to be applied when the bumper has been forced toward the vehicle and providing spring means in conjunction with the bumper for normally holding it in position in front of the car and for allowing it to slide inward when an object has been struck.

This and other subjects of the invention will be more clearly understood from the following detailed description and accompanying drawings.

Figure 1 is a top plan view of a motor vehicle with the safety device applied;

Figure 2 is a section along the line 2—2, Figure 1;

Figure 3 is a section along the line 3—3, Figure 1;

Figure 4 is a section along the line 4—4, Figure 1;

Figure 5 is a section along the line 5—5, Figure 4;

Figure 6 is a section through the spring means associated with the bumper for absorbing the force of the blow struck the bumper.

Referring to the above-mentioned drawings, a motor vehicle assemblage is shown including a frame 10, brake drums 11, an emergency brake lever 12, and a plurality of shafts and lever arms interposed between the brake lever 12 and the brake drums 11 to operate the latter upon the operation of the former. The emergency brake lever 12 is retained in any desired position by means of a curved rack 21 provided with teeth which extend radially inward, and a spring-controlled dog 22 associated with the lever 12. The lower end of the lever 12 is fixed to the shaft 23 which is rotatably mounted in bearings attached to the frame 10. Normally the lever 12 is released from the rack 21 by means of a slide rod 24 which may be operated to depress the spring-controlled dog 22.

Slidably mounted on the frame 10 are two toothed rack bars 13 and 14 which serve to support a bumper 15 positioned in front of the vehicle. The bumper 15 extends in a horizontal plane across the front of the car. In order to retain the bumper in position in front of the car and to provide means for absorbing the shock in case the car hits an object, two cylindrical casings 16 and 17 having coil springs 18 mounted therein are attached to the frame 10, and rigid rods 19 and 20 are interposed between the springs and the bumper 15. A shaft 25 is rotatably mounted in bearings 26 and 27 supported on the frame 10. Fixed to this shaft 25 are three gear wheels 28, 29 and 30. The gear wheels 28 and 29 mesh with the rack bars 14 and 13, respectively. A rack bar 31 which is slidably mounted in guideways 32 and 33 meshes with the gear wheel 30. The end 34 of the rack bar 31 remote from the gear wheel is bent downward out of alinement with the main portion of the rack bar. A bell crank 35 is pivoted to the guideway 33 at 36. The lower end of the bell crank 35 is provided with a roller 37 which co-operates with the end 34 of the rack bar 31. The upper end of the bell crank is pivotally connected with one end of a connecting link 38. Loosely connected to the other end of the connecting link 38 is a bell crank 39 pivotally mounted on the curved rack 21 at 40, the upper arm 41 of the bell crank 39 being arc-shaped, conforming to the shape of the rack 21. This curved arm of the bell crank 39 projects through an opening in the dog 22 and it will be seen that by rocking the bell crank 39 about its pivot point 40 the dog 22 may be operated to release the brake lever 12 from the rack 21. A spring 42 which is located between a projection on the frame 10 and a lever arm 43 connected to the brake lever 12 operate the lever arm to swing it backward thus applying the brakes when the dog 22 has been released from the curved rack 21.

When the motor vehicle is in operation and an object is encountered by the bumper 15 the bumper is forced towards the vehicle, the force of the blow being gradually taken up by means of the springs 18. As the bumper 15 moves towards the vehicle, the rack bars 13 and 14 slide on the frame 10, rotating the gears 28 and 29 clockwise, as viewed in Figure 4. This rotates the gear 30 clockwise and forces the rack bar 31 in the same direction that the rack bars 13 and 14 travel. The rack bar 31 engages the bell crank 35, swinging the arms upward and drawing the connecting link 38 forward. when the connecting link 38 is drawn forward it rocks the bell crank 39 about the pivot point 40, drawing the arm 41 downward thus depressing the dog 22 and releasing the brake lever 12 from the rack 21. When the brake lever 12 has been released the spring 42 swings it backward, applying the brakes, which serve to stop the motion of the vehicle. After force ceases to be applied to the bumper 15 the springs 18 return the bumper to its original position, and when the brakes are removed by the operation of the brake lever the machine is ready for operation again.

We would state in conclusion that while the illustrated example constitutes a practical embodiment of our invention we do not limit ourselves strictly to the exact details herein illustrated since manifestly the same can be considerably varied without departing from the spirit of the invention as defined in the appended claims.

Claims:

1. In combination with a motor vehicle including brakes and an emergency brake lever for operating the brakes, safety devices of the class described comprising a bumper, rack bars slidably mounted on the vehicle frame supporting the bumper, spring means associated with the bumper for absorbing the shock when the bumper strikes an object, an arc-shaped bar mounted on the vehicle frame and co-operating with the emergency brake lever, means interposed between the rack bars and the curved bar for utilizing the movement of the bumper to operate the curved bar to release the brake lever, and a spring for positively operating the brake lever when it is released.

2. In combination with a motor vehicle including brakes and an emergency brake lever for operating the brakes, a safety device of the class described comprising a bumper, rack bars slidably mounted on the vehicle frame supporting the bumper, spring means associated with the bumper for absorbing the shock when the bumper strikes an object, sprocket wheels fixed to a shaft revolvably mounted on the vehicle frame, two of said sprocket wheels meshing with the rack bars carrying the bumper, the third sprocket wheel meshing with the rack bar slidable on the vehicle frame, a bell crank pivotally connected to the vehicle frame and co-operating with the brake lever to release the same, means interposed between the rack bar and the bell crank for utilizing the movement of the bumper to operate the latter to release the emergency brake lever, an arm attached to the emergency brake lever, and a spring interposed between said arm and the vehicle frame for positively operating the brake lever when it is released by the bell crank.

3. In a safety device of the class described for operating the emergency brake lever of a motor vehicle to apply the brakes including a bumper, means for operating the brake lever comprising a bell crank having an arc-shaped arm for releasing the brake lever, means for utilizing the movement of the bumper to operate the bell crank, an arm attached to the emergency brake lever and a spring interposed between said arm and vehicle frame to positively operate the brake lever when the bell crank has been operated releasing the brake lever.

4. In combination with a motor vehicle including brakes and a brake lever for operating the brakes, a safety device of the class described comprising a bumper, toothed rack bars for supporting a bumper slidably mounted on the vehicle frame, spring means associated with the bumper for retaining it in position in front of the vehicle, means for releasing the brake lever to apply the brakes, a bell crank associated with said releasing means, means interposed between the bumper supporting racks and the bell crank for utilizing the movement of the bumper toward the car when it strikes an object to operate the lever releasing means, and means for operating the brake lever when released to apply the brakes.

ANDREW RYGIEL.
JULIUS STERN.